(12) United States Patent
Jiang et al.

(10) Patent No.: US 12,669,418 B2
(45) Date of Patent: Jun. 30, 2026

(54) FROZEN SOLUTION SAMPLE PREPARATION DEVICE APPLICABLE TO ULTRA-HIGH VACUUM SYSTEM

(71) Applicant: Peking University, Beijing (CN)

(72) Inventors: Ying Jiang, Beijing (CN); Jiadong Guo, Beijing (CN); Xinmeng Liu, Beijing (CN); Jiani Hong, Beijing (CN)

(73) Assignee: Peking University, Beijing (CN)

( * ) Notice: Subject to any disclaimer, the term of this patent is extended or adjusted under 35 U.S.C. 154(b) by 319 days.

(21) Appl. No.: 18/623,919

(22) Filed: Apr. 1, 2024

(65) Prior Publication Data

US 2025/0224316 A1 Jul. 10, 2025

(30) Foreign Application Priority Data

Jan. 4, 2024 (CN) .......................... 202410013384.4

(51) Int. Cl.
*G01N 1/42* (2006.01)
*G01Q 30/10* (2010.01)
*G01Q 30/16* (2010.01)
*G01Q 30/20* (2010.01)

(52) U.S. Cl.
CPC ............... *G01N 1/42* (2013.01); *G01Q 30/10* (2013.01); *G01Q 30/16* (2013.01); *G01Q 30/20* (2013.01)

(58) Field of Classification Search
CPC .......... G01N 1/42; G01Q 30/10; G01Q 30/16; G01Q 30/20
See application file for complete search history.

(56) References Cited

U.S. PATENT DOCUMENTS

| | | | |
|---|---|---|---|
| 2015/0147778 A1* | 5/2015 | Pickard | G01N 1/44 62/344 |
| 2019/0170625 A1* | 6/2019 | Nijpels | H01J 37/20 |
| 2022/0057046 A1* | 2/2022 | Dessau | F25B 9/10 |

FOREIGN PATENT DOCUMENTS

CN 112557422 A * 3/2021 ......... G01N 23/2202

* cited by examiner

*Primary Examiner* — Thomas M Hammond, III
(74) *Attorney, Agent, or Firm* — Westbridge IP LLC

(57) ABSTRACT

Disclosed is a frozen solution sample preparation device applicable to an ultra-high vacuum system. The frozen solution sample preparation device includes: a sample stage, a compressible linear shift, a sample transfer chamber, a gate valve, a solution vessel and a vacuum pump; where the sample stage includes a cooling system and a sample preparation system; an interior of the compressible linear shift has a hollowed structure; a top end of the sample transfer chamber is hermetically connected to a bottom end of the compressible linear shift, the sample transfer chamber is connected to the interior of the compressible linear shift to form a connected chamber, and the connected chamber is connected to the vacuum pump; and the solution vessel is connected to a bottom end of the sample transfer chamber through the gate valve.

10 Claims, 5 Drawing Sheets

FROZEN SOLUTION SAMPLE PREPARATION DEVICE APPLICABLE TO ULTRA-HIGH VACUUM SYSTEM

CROSS-REFERENCE TO RELATED APPLICATIONS

This application claims priority to Chinese Patent Application No. 202410013384.4, filed on Jan. 4, 2024, the content of which is incorporated herein by reference in its entirety.

TECHNICAL FIELD

The present disclosure relates to the technical field of sample preparation, in particular to a frozen solution sample preparation device applicable to an ultra-high vacuum system.

BACKGROUND

The new technologies are driven to further develop for characterizing structures and properties of solutions in microscopic detail since solution environment is common in life.

To date, a solution characterization technology mainly relies on spectroscopic methods, such as X-ray diffraction (XRD), infrared spectroscopy (IR) and nuclear magnetic resonance spectroscopy (NMR). These methods can measure a macroscopic solution at ambient condition. In general, in these spectroscopic methods, X-rays, infrared or microwave light is introduced into a solution system, a diffraction or transmission spectrum is measured, and then general information of interaction is obtained from the spectrum. However, those spectroscopic methods have poor spatial resolution, and the results are ensemble average results after superposition of numerous solute and solution molecules in general, and cannot characterize local structures and interaction details.

In order to capture microscopic information such as the local structure of the interaction between molecules, atoms or ions, a high spatial resolution detection means is required, for example, an ultra-high vacuum low-temperature scanning probe microscope (SPM). This surface sensitive technique often requires ultra-high vacuum environment, which can minimize interference of impurities and contamination in the atmosphere on measurement results. In addition, low temperature environment relying on an ultra-high vacuum system can reduce a temperature drift and the thermal disturbance on the measurement signals.

However, the solution is usually incompatible with the ultra-high vacuum condition. A nub of the high-resolution detection of the solution lies in a method for transferring the solution to the ultra-high vacuum environment, while guaranteeing cleanliness of the solution and maintaining of an intrinsic state of the solution during transfer.

In order to apply the ultra-high vacuum compatible techniques to the study of solution, various improvement have been made including liquid-phase ultra-fast electron diffraction, liquid-phase photoelectron spectroscopy, electrospray ionization technology, etc. However, these methods have inherent defects. For example, the liquid-phase ultrafast electron diffraction and the liquid-phase photoelectron spectroscopy are not compatible with the real-space imaging technology such as SPM. It is difficult to obtain the intrinsic state of the solution by the electrospray ionization technology.

SUMMARY

In view of this, the present disclosure provides a frozen solution sample preparation device applicable to an ultra-high vacuum system, which can transfer a solution sample to an ultra-high vacuum system, while guaranteeing cleanliness of the solution and maintaining an intrinsic state of the solution during transfer.

A technical solution of the present disclosure is implemented as follows.

The frozen solution sample preparation device applicable to an ultra-high vacuum system includes: a sample stage, a compressible linear shift, a sample transfer chamber, a gate valve, a solution vessel and a vacuum pump system; where the sample stage includes a cooling system and a sample preparation system, and the sample preparation system is fixed at a bottom end of the cooling system; an interior of the compressible linear shift has a hollowed structure, a lower portion of the sample stage is arranged in the compressible linear shift, and a top end of the compressible linear shift is hermetically fixed to the sample stage; a top end of the sample transfer chamber is hermetically connected to a bottom end of the compressible linear shift to form a connected chamber, and the chamber is connected to the vacuum pump system; and the solution vessel is connected to a bottom end of the sample transfer chamber through the gate valve.

Preferably, the cooling system includes: a cryogenic liquid inlet, a cryogenic liquid outlet and a cryogenic dewar; and the cryogenic dewar has an annular cylindrical tank structure with a cavity in a middle, and each of bottom ends of the cryogenic liquid inlet and the cryogenic liquid outlet is connected to the cryogenic dewar.

Preferably, feedthrough pins are arranged at a top of the sample stage, a heater is arranged in the cavity in the middle of the cryogenic dewar, and the heater is connected to the feedthrough pins through wires.

Preferably, an upper portion of the sample stage is provided with a flange plate, each of top ends of the cryogenic liquid inlet and the cryogenic liquid outlet upwardly penetrates out of a via hole reserved in the flange plate, a bottom end of the feedthrough pins downwards penetrate a via hole reserved in the flange plate to be connected to terminals on the heater, and a portion, below the flange plate, of the sample stage is arranged in the interior of the compressible linear shift and is connected to the compressible linear shift through the flange plate.

Preferably, the top end of the compressible linear shift is hermetically fixed to the sample stage through a port aligner.

Preferably, the sample preparation system includes a sample socket and a sample holder; the sample socket is fixed at a bottom end of the cryogenic dewar, and a bottom of the sample socket is provided with a spring clip for clamping the sample holder; and a sample substrate for collecting a solution sample is fixed on a lower surface of the sample holder.

Preferably, the sample transfer chamber is a cube chamber, the top end of the sample transfer chamber is provided with an upper flange for being connected to the compressible linear shift, and the bottom end of the sample transfer chamber is provided with a lower flange for being connected to the gate valve; a front end of the sample transfer chamber is provided with a flange for sample transport that outwards stretches out and is connected to and accommodates a sample transporter, and a rear end of the sample transfer chamber is provided with a main chamber flange for being connected to a main characterization chamber; and a left end of the sample transfer chamber is provided with a standby flange, and a right end of the sample transfer chamber is provided with an observation window.

Preferably, the frozen solution sample preparation device further includes a lifting assembly, where the lifting assembly is connected to the compressible linear shift.

Preferably, the lifting assembly includes a threaded rod, a lifting part and a supporting part; the lifting part is fixed at an upper portion of the compressible linear shift, and the supporting part is fixed at a lower portion of the compressible linear shift; and a bottom end of the threaded rod is rotatably connected to the supporting part, and a top end of the threaded rod upwards penetrates a threaded hole in the lifting part.

Preferably, the lifting assembly further includes a ruler, a bottom end of the ruler is fixed on the supporting part, and a top end of the ruler upwardly extends out of a via hole reserved in the lifting part.

As can be seen from the above, in the frozen solution sample preparation device applicable to an ultra-high vacuum system according to the present disclosure, the solution sample is frozen on the sample preparation system through the cooling system. In this way, the solution sample can be transferred in a frozen form into the ultra-high vacuum system for being characterized, and can have extremely high cleanliness during transfer, and original information in the solution can be kept. Further, the device provided by the present disclosure can also be used together with an ultra-high vacuum surface analysis methods such as a high-resolution scan probe microscopy, and in this way, an atomic-scale structure and composition information can be obtained. The frozen solution sample preparation device in the present disclosure has wide applications, is applicable to various solution systems, can transfer unstable molecules without heating and evaporation, and can also conveniently prepare samples for a multi-ion/solvent system.

DETAILED DESCRIPTION OF THE EMBODIMENTS

Figure 1:
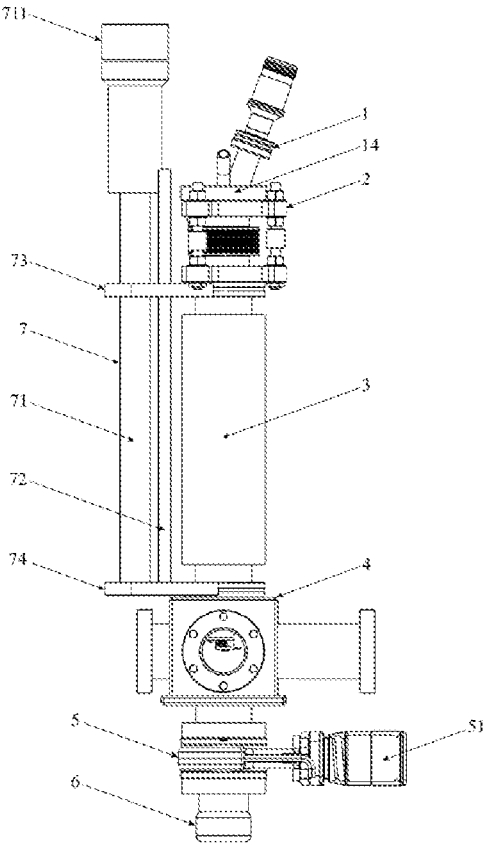
FIG. 1 is a schematic structural diagram of a frozen solution sample preparation device applicable to an ultra-high vacuum system according to an example of the present disclosure.

To make technical solutions and advantages of the present disclosure clearer, the present disclosure will be further described in detail with reference to accompanying drawings and in conjunction with examples.

As shown in FIGS. 1-5, a frozen solution sample preparation device applicable to an ultra-high vacuum system includes: a sample stage 1, a compressible linear shift 3, a sample transfer chamber 4, a gate valve 5, a solution vessel 6 and a vacuum pump.

The sample stage 1 includes a cooling system 11 and a sample preparation system 12, and the sample preparation system 12 is fixed at a bottom end of the cooling system 11.

An interior of the compressible linear shift 3 has a hollowed structure, a lower portion of the sample stage 1 is arranged in the compressible linear shift 3, and a top end of the compressible linear shift 3 is hermetically fixed to the sample stage 1.

A top end of the sample transfer chamber 4 is hermetically connected to a bottom end of the compressible linear shift 3, the sample transfer chamber 4 is connected to the interior of the compressible linear shift 3 to form a connected chamber, and the connected chamber is connected to the vacuum pump.

The solution vessel 6 is connected to a bottom end of the sample transfer chamber 4 through the gate valve 5.

In the technical solution of the present disclosure, the solution vessel 6 may be cleaned at first and then injected with a solution to be characterized, and the solution vessel 6 is mounted at a lower end of the gate valve 5. Before an experiment, the solution to be characterized may be purified at first. For example, the gate valve 5 is closed at first, the sample transfer chamber 4 is kept isolated from the solution vessel 6, and the vacuum pump (not shown in the figures) that is connected to the connected chamber is powered on to vacuumize an interior of the connected chamber that is formed by the sample transfer chamber 4 and the compressible linear shift 3, such that the phenomenon that internal impurities enter the solution vessel and affect the solution can be prevented. Besides, the solution vessel 6 is cooled (for example, an external liquid nitrogen container may be used to cool the solution vessel), the solution in the solution vessel 6 is frozen into a solid state, then the gate valve 5 is opened, and the solution vessel 6 is connected to the sample transfer chamber 4. In this case, gas in the solution vessel is pumped out by the vacuum pump under the action of the vacuum pump. Then, the gate valve 5 is closed again, the solution vessel is cooled again after the solution is completely melted, and the solution is frozen. The gate valve 5 is opened again to vacuumize the solution vessel, and finally the gate valve 5 is closed. The above process is repeated several times until there is no excess impurity gas in the solution vessel 6, and the solution is purified.

When the experiment is to be conducted (the gate valve 5 is kept closed after the solution is purified), the solution vessel 6 is kept isolated from the above sample transfer chamber 4, and the interior of the connected chamber that is formed by the sample transfer chamber 4 and the compressible linear shift 3 is vacuumized into an ultra-high vacuum environment by the vacuum pump. At a room temperature, the solution vessel 6 is filled with the solution in saturated vapor pressure environment. Before transferring the solution sample, the solution vessel 6 is cooled (for example, the external liquid nitrogen container may be used to cool the solution vessel), and the solution is frozen into a solid state. Then, the gate valve 5 is opened, the sample stage 1 is downwards moved, such that the compressible linear shift 3 is compressed. At the same time, the sample preparation system 12 at a bottom end of the sample stage 1 goes down into the solution vessel 6 to come into contact with an upper surface of the frozen solution. Since the sample preparation system 12 is at a room temperature, the sample preparation system melts a surface ice layer after coming into full contact with the upper surface of the frozen solution, and then the sample stage is slowly lowered by a certain height (for example, 0.5 mm-1 mm) to further melt the surface ice layer. The above process is repeated several times (for example, 3-5 times) until a bottom end of the sample preparation system 12 comes in complete contact with a surface melted layer (for example, the bottom end of the sample preparation system 12 may be provided with a sample substrate 1222, and the sample substrate 1222 can come into complete contact with the surface melted layer in this process). In this case, the cooling system 11 is adopted to cool the sample preparation system 12, such that the solution surface is frozen again. Then, by upwards moving the sample stage 1, the compressible linear shift 3 is restored. At the same time, the sample preparation system 12 cleavages a thin-layer solution ice layer (for example, a nano-scale thin-layer solution ice layer) frozen together with its bottom end out of the solution vessel upwards and into the sample transfer chamber 4. Then, the gate valve 5 is closed again, the solution sample enters the ultra-high vacuum and can be further characterized in the ultra-high vacuum system.

It can thus be seen that in the technical solution of the present disclosure, the solution sample is quickly frozen and transferred onto the sample preparation system 12, the solution sample can be transferred into the ultra-high vacuum system for being characterized, and can keep its cleanliness during transfer, and original information in the solution can be kept. Further, the device can also be used together with ultra-high vacuum surface analysis instruments such as a high-resolution scan probe microscope. In this way, an atomic-scale structure and composition information can be obtained without relying on a solution simulation manner of samples growing together (co-deposition). In addition, the frozen solution sample preparation device in the present disclosure has wide applications, is applicable to various solution systems, can transfer unstable molecules without heating and evaporation, and can also conveniently prepare samples for a multi-ion/solvent system.

In the technical solution of the present disclosure, various implementation methods can be used to implement the frozen solution sample preparation device applicable to an ultra-high vacuum system. The technical solution of the present disclosure will be introduced in detail below with one of the implementation modes as an example.

Figure 2:
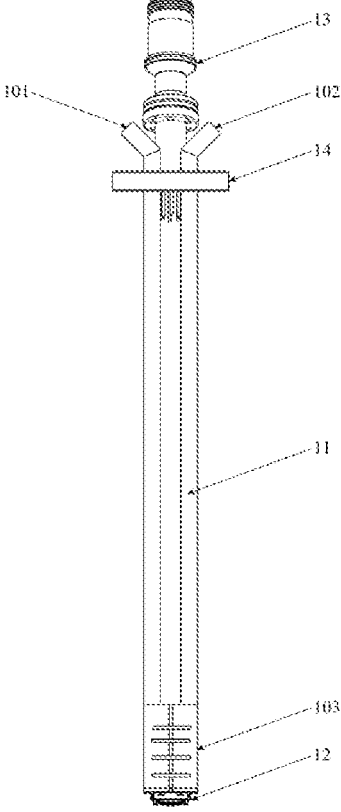
FIG. 2 is a schematic structural diagram of a sample stage according to an example of the present disclosure.
Figure 3:
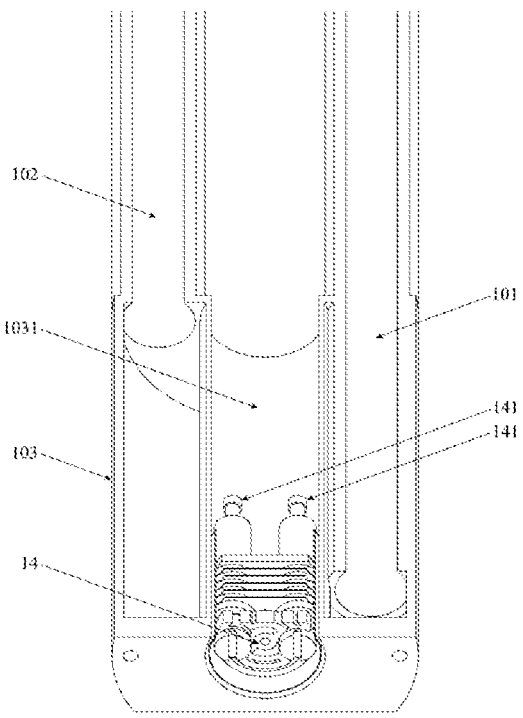
FIG. 3 is a schematic structural diagram of a cryogenic dewar according to an example of the present disclosure.

For example, in a specific preferred example of the present disclosure as shown in FIGS. 2 and 3, the cooling system 11 may include a cryogenic liquid inlet 101, a cryogenic liquid outlet 102 and a cryogenic dewar 103.

The cryogenic dewar 103 has an annular cylindrical tank structure with a cavity 1031 in a middle, and each of bottom ends of the cryogenic liquid inlet 101 and the cryogenic liquid outlet 102 is connected to the cryogenic dewar 103.

For example, in a specific preferred example of the present disclosure as shown in FIG. 3, in order to better cooling the solution, the bottom end of the cryogenic liquid inlet 101 may extend into a bottom in the cryogenic dewar 103, and the bottom end of the cryogenic liquid outlet 102 is connected to a top end in the cryogenic dewar 103.

By extending the bottom end of the cryogenic liquid inlet 101 into the bottom in the cryogenic dewar 103, liquid nitrogen can directly reach the bottom in the cryogenic dewar 103 after flowing out of the cryogenic liquid inlet 101, so as to cool the solution sample in time. In this way, the phenomenon that the liquid nitrogen flows in the cryogenic dewar for a too long time to absorb excess heat, and a cooling effect is affected according is prevented. Part of liquid nitrogen absorbing heat is gasified into nitrogen. The bottom end of the cryogenic liquid outlet 102 is connected to the top end in the cryogenic dewar 103, such that the nitrogen can conveniently flow out in time, and the liquid nitrogen continuously flowing into the cryogenic dewar can be discharged out from the cryogenic dewar 103. In this way, the liquid nitrogen can be fully utilized for cooling the sample preparation system and the solution sample (for example, the cooling system can cool the sample preparation system to about −190° C.), and cooling efficiency and effect can be improved accordingly.

For example, in a specific preferred example of the present disclosure as shown in FIGS. 2 and 3, in order to accelerate melting of the surface ice layer of the frozen solution by the sample preparation system 12 during the experiment, an feedthrough pins 13 may be arranged at a top of the sample stage 1, a heater 14 is arranged in the cavity 1031 in the middle of the cryogenic dewar 103, and the heater 14 is connected to the feedthrough pins 13 through a wire.

For example, the heater 14 has a terminal 141 for being connected to the feedthrough pins 13 preferably.

In the technical solution of the present disclosure, before the sample stage downwards moves, the heater 14 placed at a bottom of the cavity 1031 of the cryogenic dewar may be used to preheat the sample preparation system 12 mounted at the bottom end of the cooling system, so as to raise a temperature of the same. In this way, when the sample preparation system comes into contact with the surface of the frozen solution, the surface ice layer can be melted quickly without waiting for too long, and experimental efficiency is improved accordingly.

Further, for example, in a specific preferred example of the present disclosure as shown in FIGS. 1 and 2, an upper portion of the sample stage 1 is provided with a flange plate 14, and each of top ends of the cryogenic liquid inlet 101 and the cryogenic liquid outlet 102 upwardly penetrates out of a via hole reserved in the flange plate, so as to be conveniently connected to an external nitrogen supply device. A bottom end of the feedthrough pins 13 downwards penetrates a via hole reserved in the flange plate to be connected to a terminal on the heater, and a portion, below the flange plate, of the sample stage 1 is arranged in the interior of the compressible linear shift 3 and is connected to the compressible linear shift 3 through the flange plate 14.

Further, for example, in a specific preferred example of the present disclosure as shown in FIG. 1, the top end of the compressible linear shift 3 may be hermetically fixed to the sample stage 1 through port aligner 2.

Further, for example, in a specific preferred example of the present disclosure as shown in FIG. 1, port aligner 2 may be arranged between the top end of the compressible linear shift 3 and the flange plate 14 of the sample stage 1. One side of the port aligner is hermetically fixed at a bottom of the flange plate 14, the other side of the port aligner is hermetically fixed at the top end of the compressible linear shift 3, and the two flanges are hermetically connected to each other through a plurality of studs.

In the technical solution of the present disclosure, the two parts of the port aligner 2 may be connected to each other through three studs. In this way, a tilt angle between the fixedly connected flange plate 14 of the sample stage and a horizontal plane can be controlled by adjusting the three studs, and the tilt angle between the sample stage and the horizontal plane can be adjusted accordingly. As a result, the sample stage is finely adjusted through the port aligner, the sample preparation system can accurately enter the solution vessel to collect solution samples conveniently.

Further, for example, in a specific preferred example of the present disclosure, the compressible linear shift 3 may have a corrugated structure, such that extension and compression can be implemented.

Figure 4:
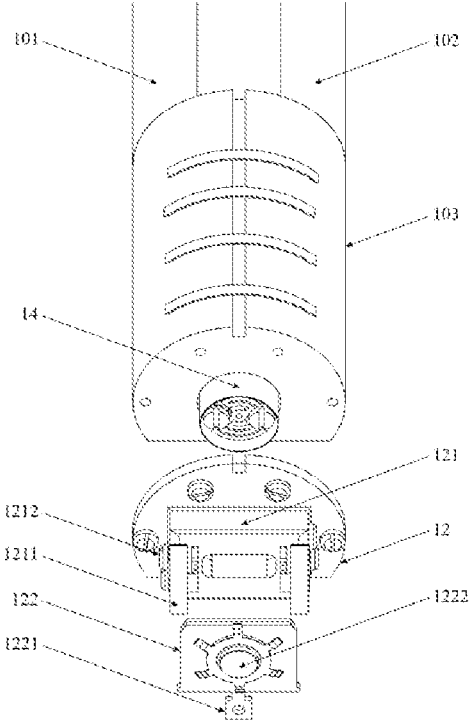
FIG. 4 is a schematic structural diagram of a sample preparation system according to an example of the present disclosure.

Further, for example, in a specific preferred example of the present disclosure as shown in FIG. 4, the sample preparation system 12 may include a sample socket 121 and a sample holder 122.

The sample socket 121 is fixed at a bottom end of the cryogenic dewar 103, and a bottom of the sample socket 121 is provided with a reed 1211 for clamping the sample holder 122.

A sample substrate 1222 for collecting a solution sample is fixed on a lower surface of the sample holder 122.

In a study experiment of the solution, the solution sample is usually placed on a clean sample substrate. The sample substrate is often made from metal single crystal or graphite. In the technical solution of the present disclosure, by arranging the sample substrate 1222 on a lower surface of the sample holder 122, the sample substrate may come into contact with the surface ice layer of the frozen solution at first when the sample stage 1 downwards moves. Then, the ice layer is melted, and is frozen by the cooling system, the sample substrate and the surface of the solution can be frozen together. Then, the sample stage upwards moves, and the sample substrate can take away the thin-layer solution ice layer frozen on the surface of the sample substrate, and collect solution samples.

Since a normal state of the solution is liquid, the liquid solution usually emits gas molecules, and no molecules or gases are allowed in the ultra-high vacuum environment. In view of that, in the prior art, it is difficult to transfer the solution to the ultra-high vacuum environment, let alone transfer the solution to the sample substrate in the ultra-high vacuum environment. In the technical solution of the present disclosure, by using the frozen solution sample preparation device, by the technical means of freezing the solution and local melting (since a melting range of the solution is small, and freezing is implemented immediately by the cooling system after melting, influence of a short-term small-range liquid state on the ultra-high vacuum environment can be ignored), the solution sample can be transferred onto the substrate in the ultra-high vacuum environment, and there is no other contact during the entire process. In this way, cleanliness of the solution sample can be guaranteed, and the freezing means can also maintain an intrinsic state of the solution, such that experimental results can be guaranteed accordingly.

Further, for example, in a specific preferred example of the present disclosure as shown in FIG. 4, the sample socket 121 may also be provided with a temperature sensor 1212 for monitoring a temperature of the sample holder in real time, such that a temperature of the sample holder can be monitored during a heating or cooling process. Data monitored by the temperature sensor can also reflect whether the sample holder comes into contact with a frozen solution or a melted solution. For example, when the sample holder comes into contact with the frozen solution, a decreased temperature is monitored by the temperature sensor, but when the solution is melted, a increased temperature is monitored by the temperature sensor. When the solution is frozen by the cooling system again, the temperature sensor may monitor a decreased temperature again.

Figure 5:
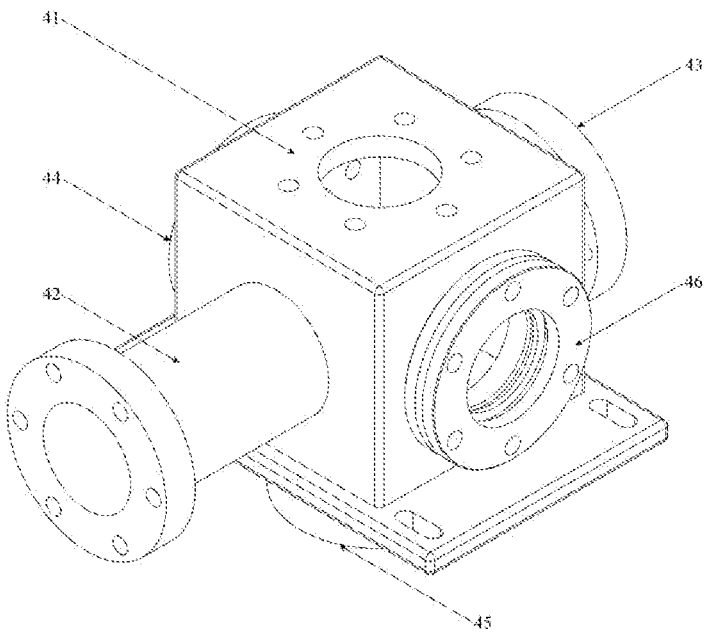
FIG. 5 is a schematic structural diagram of a sample transfer chamber according to an example of the present disclosure.

Further, for example, in a specific preferred example of the present disclosure as shown in FIG. 5, the sample transfer chamber 4 may be a cube chamber, the top end of the sample transfer chamber 4 is provided with an upper flange 41 for being connected to the compressible linear shift 3, and the bottom end of the sample transfer chamber is provided with a lower flange 45 for being connected to the gate valve 5. A front end of the sample transfer chamber is provided with a sample transfer device connector 42 that outwards stretches out and is connected to and accommodates a sample transfer device, and a spring clip end of the sample transfer chamber is provided with a main chamber flange 43 for being connected to a main characterization chamber. A left end of the sample transfer chamber is provided with a standby flange 46, and a right end of the sample transfer chamber is provided with an observation window 44.

For example, as shown in FIG. 4, the sample holder 122 may be provided with a grasping portion 1221 for grasping by the sample transfer device preferably.

For example, the sample transfer device may be a magnetic rod preferably.

In the technical solution of the present disclosure, the sample transfer chamber may be connected to the main characterization chamber (not shown in the figures) by using the main chamber flange 43. In this way, the connected chamber that is formed by the sample transfer chamber 4 and the compressible linear shift 3 is connected to the main characterization chamber, and ultra-high vacuum environment with a larger space is formed inside.

Further, the sample transfer device (not shown in the figures) is connected in the sample transfer device connector. Since the sample transfer device connector 42 outwards extends by a preset length, there is enough space to accommodate the sample transfer device. During the experiment, at first, the sample transfer device outwards extend into the main characterization chamber to grasp the sample holder with the sample substrate, and then retracts back into the sample transfer device connector to reserve space for the sample stage 1 to be lowered. In this case, the sample stage 1 is lowered, observation is performed through the observation window 44, and the sample stage is stopped from being lowered when the sample socket 121 at the bottom end of the sample stage is flush with the sample holder on the sample transfer device. Then the sample transfer device outwards extends again, and the sample holder is clamped on the reed of the sample holder, so as to be mounted. Then the gate valve 5 is opened, the sample stage is lowered, and the sample holder enters the solution vessel to collect frozen solution samples. When solution samples are collected, the sample transfer device may be slightly extended again to the cooling system near the sample stage, and the cooling system may precool the sample transfer device while cooling the melted solution on the surface layer. In this way, rapid melting of the solution ice layer can be prevented when the sample transfer device grasps later the sample holder that collects a solution ice layer sample. When the sample holder collects the solution ice layer sample and rises upwards, the precooled sample transfer device may be used to outwards extend again, grasp the sample holder and withdraw, so as to reserve space for the sample stage to rise. After the sample stage rises, the sample transfer device outwards extends again into the main characterization chamber, and the sample holder that collects the solution ice layer sample is sent back into the main characterization chamber for a next characterization experiment. It is certain that positions of the sample stage and the sample holder at the bottom the sample stage can also be adjusted by adjusting the adjustment flange 2. In this way, the sample transfer device can better mount and grasp the sample holder conveniently.

Further, in a specific preferred example of the present disclosure, the standby flange 46 may also be made into an observation window, and may be opposite the observation window 44 for the convenience of observation. In addition, when necessary, accessories such as a cryopump or a vacuum gauge may also be mounted at the standby flange 46.

Further, in a specific preferred example of the present disclosure, the solution vessel 6 may be a transparent tank, so as to facilitate observation of an internal solution state and conditions of solution sample collection.

Further, in a specific preferred example of the present disclosure as shown in FIG. 1, the frozen solution sample preparation device applicable to an ultra-high vacuum system may further include a lifting assembly 7, and the lifting assembly 7 is connected to the compressible linear shift 3. In this way, the lifting assembly 7 can guide and support the compressible linear shift 3 during stretching-out and drawing-back movement, and stability of the compressible linear shift 3 during movement is guaranteed accordingly.

For example, in a specific preferred example of the present disclosure as shown in FIG. 1, the lifting assembly 7 may include a screw 71, a lifting part 73 and a supporting part 74.

The lifting part 73 is fixed at an upper portion of the compressible linear shift 3, and the supporting part 74 is fixed at a lower portion of the compressible linear shift 3.

A bottom end of the threaded rod 71 is rotatably connected to the supporting part 74, and a top end of the threaded rod 71 upwards penetrates a threaded hole in the lifting part 73.

During the experiment, when the sample stage 1 needs to be lowered, the compressible linear shift 3 is downwards compressed, the screw 71 is rotated, and a bottom end of the screw 71 rotates on the supporting part 74. Since the threaded hole on the lifting part 73 is connected to the screw 71 in a threaded manner, the screw 71 drives the lifting part 73 to downwards move along the screw 71 in a threaded manner while rotating, then the upper portion of the compressible linear shift 3 is driven to be downwards, compressed, the sample stage 1 may be lowered, and the bottom end of the sample stage may downwards extend into the solution vessel. When the sample stage 1 needs to rise, the screw 71 may be rotated reversely, the lifting part and the upper portion of the compressible linear shift 3 are driven to upwards move along the screw, and the sample stage rises accordingly.

For example, in a specific preferred example of the present disclosure, the top end of the screw 71 may be provided with a crank 711 for facilitating rotation of the screw 71.

Further, for example, in a specific preferred example of the present disclosure as shown in FIG. 1, the lifting assembly 7 may further include a ruler 72, a bottom end of the ruler 72 is fixed on the supporting part 74, and a top end of the ruler 72 upwardly extends out of a via hole reserved in the lifting part 73. The lifting part 73 slides up and down on the ruler 72 while moving up and down along the screw 71, such that a movement distance of the sample preparation system that is at the bottom of the sample stage in the solution vessel can be determined based on a movement distance of the lifting part 73 on the ruler 72. Then, a distance for the sample holder to be slowly lowered after coming into contact with the solution ice layer can be controlled more accurately.

To sum up, in the technical solution of the present disclosure, the solution sample is quickly frozen and transferred onto the sample preparation system, the solution sample can be transferred into the ultra-high vacuum system for being characterized, and can has extremely high cleanliness during transfer, and original information in the solution can be kept. Further, the device provided by the present disclosure can also be used together with an ultra-high vacuum surface analysis means such as a high-resolution scan probe microscope, and in this way, an atomic-scale structure and composition information can be obtained. The frozen solution sample preparation device in the present disclosure has wide applications, is applicable to various solution systems, can transfer unstable molecules without heating and evaporation, and can also conveniently prepare samples for a multi-ion/solvent system.

The above examples are merely preferred examples of the present disclosure, and are not intended to limit the present disclosure, and any modification, equivalent replacement, improvement, etc. made within the spirit and principles of the present disclosure should fall within the protection scope of the present disclosure.

What is claimed is:

1. A frozen solution sample preparation device applicable to an ultra-high vacuum system, comprising: a sample stage, a compressible linear shift, a sample transfer chamber, a gate valve, a solution vessel and a vacuum pump; wherein the sample stage comprises a cooling system and a sample preparation system, and the sample preparation system is fixed at a bottom end of the cooling system;

an interior of the compressible linear shift has a hollowed structure, a lower portion of the sample stage is arranged in the compressible linear shift, and a top end of the compressible linear shift is hermetically fixed to the sample stage;

a top end of the sample transfer chamber is hermetically connected to a bottom end of the compressible linear shift, the sample transfer chamber is connected to the interior of the compressible linear shift to form a connected chamber, and the connected chamber is connected to the vacuum pump; and the solution vessel is connected to a bottom end of the sample transfer chamber through the gate valve.

2. The frozen solution sample preparation device according to claim 1, wherein the cooling system comprises: a cryogenic liquid inlet, a cryogenic liquid outlet and a cryogenic dewar; and the cryogenic dewar has an annular cylindrical tank structure with a cavity in a middle, and each of bottom ends of the cryogenic liquid inlet and the cryogenic liquid outlet is connected to the cryogenic dewar.

3. The frozen solution sample preparation device according to claim 2, wherein an feedthrough pins is arranged at a top of the sample stage, a heater is arranged in the cavity in the middle of the cryogenic dewar, and the heater is connected to the feedthrough pins through a wire.

4. The frozen solution sample preparation device according to claim 3, wherein an upper portion of the sample stage is provided with a flange plate, each of top ends of the cryogenic liquid inlet and the cryogenic liquid outlet upwardly penetrates out of a via hole reserved in the flange plate, a bottom end of the feedthrough pins downwards penetrates a via hole reserved in the flange plate to be connected to a terminal on the heater, and a portion, below the flange plate, of the sample stage is arranged in the interior of the compressible linear shift and is connected to the compressible linear shift through the flange plate.

5. The frozen solution sample preparation device according to claim 1, wherein the top end of the compressible linear shift is hermetically fixed to the sample stage through the port aligner.

6. The frozen solution sample preparation device according to claim 2, wherein the sample preparation system comprises a sample socket and a sample holder;

the sample socket is fixed at a bottom end of the cryogenic dewar, and a bottom of the sample socket is provided with a reed for clamping the sample holder; and a sample substrate for collecting a solution sample is fixed on a lower surface of the sample holder.

7. The frozen solution sample preparation device according to claim 1, wherein the sample transfer chamber is a cube chamber, the top end of the sample transfer chamber is provided with an upper flange for being connected to the compressible linear shift, and the bottom end of the sample transfer chamber is provided with a lower flange for being connected to the gate valve; a front end of the sample transfer chamber is provided with a sample transfer device connector that outwards stretches out and is connected to and accommodates a sample transfer device, and a spring clip end of the sample transfer chamber is provided with a main chamber flange for being connected to a main characterization chamber; and a left end of the sample transfer chamber is provided with a standby flange, and a right end of the sample transfer chamber is provided with an observation window.

8. The frozen solution sample preparation device according to claim 1, further comprising a lifting assembly, wherein the lifting assembly is connected to the compressible linear shift.

9. The frozen solution sample preparation device according to claim 8, wherein the lifting assembly comprises a screw, a lifting part and a supporting part;

the lifting part is fixed at an upper portion of the compressible linear shift, and the supporting part is fixed at a lower portion of the compressible linear shift; and a bottom end of the threaded rod is rotatably connected to the supporting part, and a top end of the threaded rod upwards penetrates a threaded hole in the lifting part.

10. The frozen solution sample preparation device according to claim 9, wherein the lifting assembly further comprises a ruler, a bottom end of the ruler is fixed on the supporting part, and a top end of the ruler upwardly extends out of a via hole reserved in the lifting part.

\* \* \* \* \*